(12) United States Patent
Gann

(10) Patent No.: US 6,701,351 B1
(45) Date of Patent: Mar. 2, 2004

(54) METHOD AND SYSTEM FOR REMOTELY UPLOADING DIGITAL MEMORY

(75) Inventor: Robert G Gann, Bellvue, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 659 days.

(21) Appl. No.: 09/626,626

(22) Filed: Jul. 27, 2000

(51) Int. Cl.[7] .............................................. G06F 15/16
(52) U.S. Cl. ...................................... 709/217; 709/203
(58) Field of Search ................................ 709/203, 217, 709/219

(56) References Cited

U.S. PATENT DOCUMENTS

| | | | | |
|---|---|---|---|---|
| 5,633,678 A | * | 5/1997 | Parulski et al. | 348/231.5 |
| 6,337,712 B1 | * | 1/2002 | Shiota et al. | 348/231.1 |
| 6,353,848 B1 | * | 3/2002 | Morris | 709/203 |
| 6,381,029 B1 | * | 4/2002 | Tipirneni | 358/1.14 |
| 6,438,638 B1 | * | 8/2002 | Jones et al. | 710/301 |
| 6,571,271 B1 | * | 5/2003 | Savitzky et al. | 709/200 |
| 6,583,799 B1 | * | 6/2003 | Manolis et al. | 345/838 |
| 6,587,839 B1 | * | 7/2003 | McIntyre et al. | 705/27 |

FOREIGN PATENT DOCUMENTS

| | | | | |
|---|---|---|---|---|
| WO | WO 00/69164 | 4/2000 | | H04N/1/21 |
| WO | WO 01/63518 | 2/2001 | | G06F/17/60 |
| WO | WO 01/86640 | 5/2001 | | |

* cited by examiner

*Primary Examiner*—Mehmet B. Geckil

(57) ABSTRACT

A digital memory upload method and system allows the uploading of information contained in a memory element to a central processing location, or any other location defined by a user. By uploading the contents of the memory element, the memory element is made available for further use. In a preferred embodiment, the digital memory upload method and system can be used to conveniently upload the contents of a digital camera memory element, thereby freeing the memory element for further use. The contents of the memory element can be transferred to a processing location, which can forward the information to the user, can make the images available to the user via an Internet world wide web (WWW) site, or can process the information into conventional photographic prints and mail them to the user.

32 Claims, 3 Drawing Sheets

METHOD AND SYSTEM FOR REMOTELY UPLOADING DIGITAL MEMORY

FIELD OF THE INVENTION

This invention relates generally to digital image capturing and processing devices, and, more particularly, to a method and system for remotely uploading digital memory to free the memory for additional use.

BACKGROUND OF THE INVENTION

With the introduction and ever increasing popularity of digital cameras, digital photography is steadily becoming accessible for more and more individuals. Digital camera technology enables still cameras to be easier to use and more versatile than ever before. Furthermore, digital cameras capable of capturing motion pictures are also becoming available. Instead of conventional film that must be exposed to light, digital cameras use an electronically controlled image capture element (such as a charge coupled device (CCD) element or electronically controlled picture elements (pixels)) to capture an image, and use electronically controlled memory elements to store information corresponding to the image.

Typically, the memory element used to store the image is some type of removable memory element, such as a diskette, having a finite amount of memory. Alternatively, some digital cameras are capable of transferring information contained in their memory via an infrared (IR) transmitter included in the camera. To obtain a printed image, the information contained in the memory element representing the captured image is uploaded to a computer, which includes appropriate processing software. Once uploaded to a computer, the information corresponding to the captured image can be manipulated by the computer to produce the desired printed image. Other processing tasks and functionality can also be provided by the computer to which the memory information is uploaded. Once the digital camera memory element is uploaded, it can be erased and again made available for additional image capturing in the digital camera.

One drawback of digital photography is that current memory elements are expensive, are not widely available, and have only a limited amount of capacity to store information. For example, a conventional memory element may contain sufficient capacity for only a limited number of high resolution exposures. This may present a problem for those using digital cameras on vacation, where many exposures are taken and where digital memory elements are expensive and difficult to obtain.

One possible solution is to use a conventional telephone connection from, for example, a hotel to upload the digital memory element and send the information to, for example, a home computer. Unfortunately, this requires specialized equipment and technical acumen, and is slow.

Therefore, there is a need for the ability to quickly and easily upload digital memory from a variety of different locations.

SUMMARY OF THE INVENTION

The invention provides a method and system for uploading and transferring information located on a digital memory element.

The invention may be conceptualized as a method for uploading electronic information from a memory element comprising the steps of electronically transferring the electronic information from the memory element to a local storage device, electronically transferring the electronic information from the local storage device to a first location corresponding to an address entered by a user, storing the electronic information at the first location, and making the electronic information available to the user from the first location.

Architecturally, the invention can be conceptualized as a system for uploading electronic information from a memory element, comprising an electronic reader configured to read the electronic information from the memory element, a local storage device associated with the electronic reader configured to receive and store the electronic information, and a line interface configured to transfer the electronic information from the local storage device to a first location corresponding to an address entered by a user, wherein the electronic information is available to the user from the first location.

Related methods of operation and computer readable media are also provided. Other systems, methods, features, and advantages of the invention will be apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The invention, as defined in the claims, can be better understood with reference to the following drawings. The components within the drawings are not necessarily to scale relative to each other, emphasis instead being placed upon clearly illustrating the principles of the invention.

DETAILED DESCRIPTION OF THE PREFERRED EMBODIMENT

Although described with particular regard to uploading digital camera memory, the digital memory upload method and system of the invention is applicable to any type of data that can be electronically captured and transmitted over a communications channel.

Furthermore, the digital memory upload method and system of the invention can be implemented in software, hardware, or a combination thereof. In a preferred embodiment(s), selected portions of the digital memory upload method and system are implemented in hardware and software. The hardware portion of the invention can be implemented using specialized hardware logic. The software portion can be stored in a memory and be executed by a suitable instruction execution system (microprocessor). The hardware implementation of the digital memory upload method and system can include any or a combination of the following technologies, which are all well known in the art: a discrete logic circuit(s) having logic gates for implementing logic functions upon data signals, an application specific integrated circuit (ASIC) having appropriate logic gates, a programmable gate array(s) (PGA), a field programmable gate array (FPGA), etc.

Furthermore, the digital memory upload method and system software, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 1:
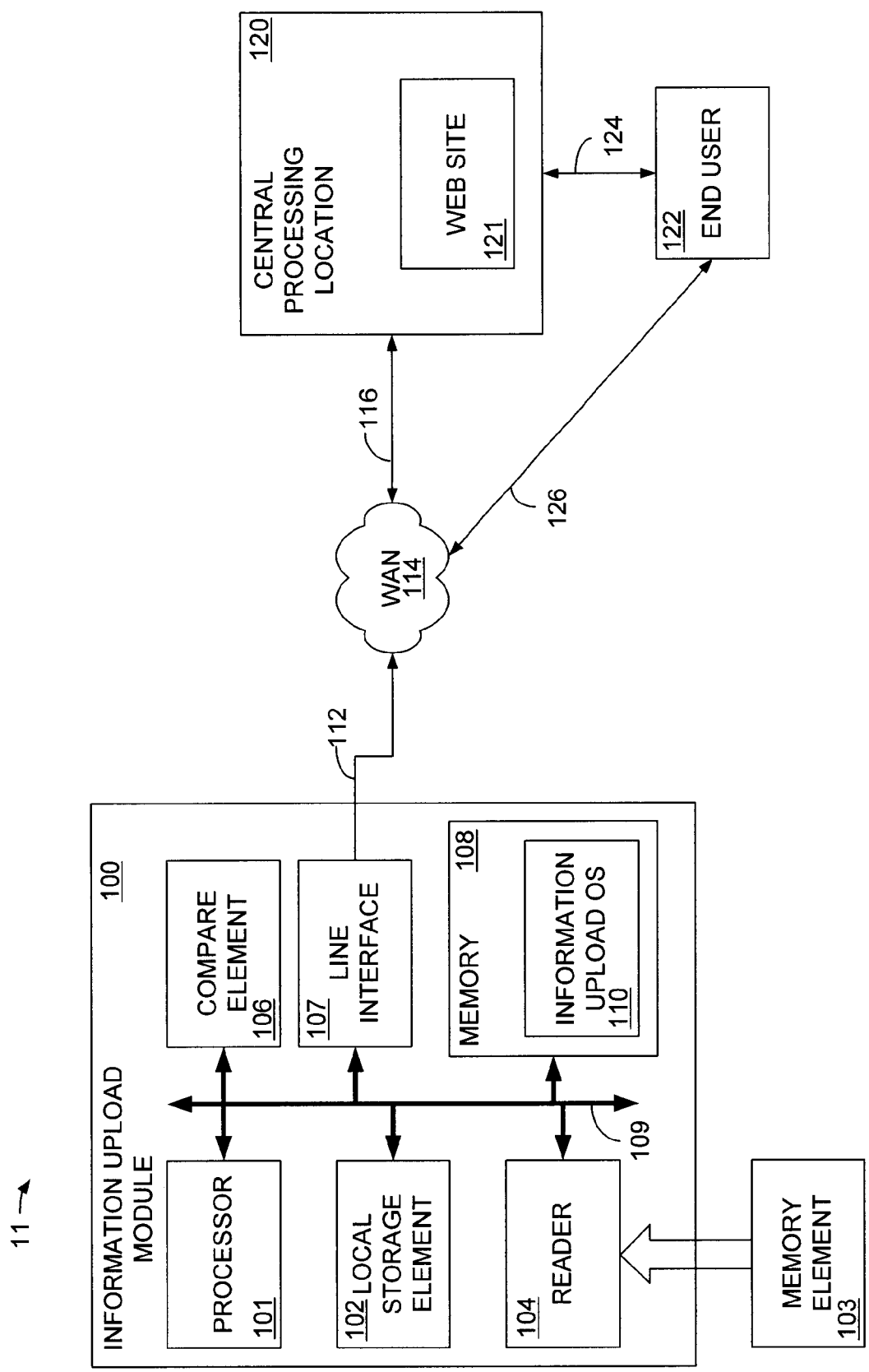
FIG. 1 is a block diagram illustrating the information upload system in accordance with an aspect of the invention/.

FIG. 1 is a block diagram illustrating the information upload system 11 in accordance with an aspect of the invention. Information upload system 11 includes information upload module 100 coupled to central processing location 120. Information upload module 100 connects to central processing location 120 via any available communications network. For example, while in a particular embodiment the information upload module 100 is connected to central processing location 120 via wide area network (WAN) 114, the information upload module 100 can be coupled to the central processing location 120 via any type of communication channel, for example but not limited to, a plain old telephone service (POTS) connection, a dedicated line, a digital subscriber line (DSL) or an information services digital network (ISDN) connection, etc.

Information upload module 100 includes processor 101 in communication with memory 108, which includes information upload operating system (OS) 110, local storage element 102, reader 104, compare element 106 and line interface 107 via bus 109. Bus 109 can be any connection architecture that connects the various elements shown within information upload module 100. Information upload module 100 couples to communication channel 112 via line interface 107, the operation of which is controlled by processor 101 and information upload OS to gain access to WAN 114. Communication channel 112 can be any of the above-mentioned communication services for connecting information upload module 100 to a communication network over which the contents of memory element 103 (to be explained below) can be electronically communicated. The information upload OS 10 contains the software of the invention, which is stored in memory 108 and executed in processor 101. The information upload OS 110 provides the operational capability for information upload module 100.

In accordance with an aspect of the invention, the information upload module 100 is used to upload digital camera memory from memory element 103, and send that uploaded information corresponding to the images captured within the digital camera to central processing location 120 via WAN 114. In accordance with an aspect of the invention, information upload module 100 may be located at any location where it would be convenient for an owner of a digital camera to upload the memory to information upload module 100. For example, information upload module 100 may be located at a fuel pump or a gasoline filling station, at a convenience store, at a hotel or a motel, in a kiosk located in a shopping center, or in any other accessible location. In accordance with this aspect of the invention, the information upload module 100 allows an owner of a digital camera to empty the memory element 103 of a digital camera and send the information to central processing location 120. The central processing location 120 can then, for example but not limited to, process the information removed from the memory element 103 and make the information available to an end user by, for example, posting the information on an Internet world wide web (WWW) site 121 or by sending the pictures, either electronically or conventionally, to end user 122. It should be noted that the foregoing represents but one aspect of the invention. It is assumed that any type of information can be uploaded and transferred in accordance with the invention.

In accordance with an aspect of the invention, reader 104 is configured to receive the contents of the memory element 103 of a digital camera and transfer that memory content via bus 109 to local storage element 102. Reader 104 can be any type of reader configured to read any type of digital memory. For example, the reader 104 should be capable of reading any available type of camera memory such as compact flash memory (CM), smart memory (SM), MEMORY STICK® (registered trademark of Sony Corporation) and even from a floppy diskette or other portable memory media. Furthermore, reader 104 may be configured to receive the contents of memory element 103 via an infrared (IR) port. Regardless of the manner in which reader 104 reads the memory element of the digital camera, reader 104 transfers this electronic information to local storage element 102.

Local storage element 102 can be, for example but not limited to, solid state memory, a hard disk or any other type of electronically accessible memory. Once the reader 104 transfers the contents of the memory element 103 to local storage element 102, compare element 106 compares the contents of the local storage element 102 with the contents of the memory element 103, thereby assuring that the contents of the digital camera memory element 103 are accurately reproduced and contained within local storage element 102. Although illustrated as a separate element, the functionality of compare element 106 may be incorporated into the processor 101. Once the contents of local storage element 102 are verified the memory element 103 can be erased, thereby freeing the memory element 103 for further use.

Alternatively, the processor 101, in cooperation with the information upload OS 110, creates a file identifier and places it in the memory element 103 so that in the future, the information upload module 100, or another similar information upload module physically located at a different location, will know that the file(s) corresponding to the then present contents of the digital camera memory element 103 have already been uploaded. This allows the user to retain a local copy on the digital camera memory element 103, add further information (take more pictures), then at a later time insert the digital camera memory element 103 into a different information upload module 100 and only the new information (pictures) would be uploaded.

After the contents of the memory element 103 have been uploaded to local storage element 102, and at a time convenient for transmission, line interface 107 will provide access to communication channel 112 so that the contents of the local storage element 102 (i.e., the former contents of the memory element 103) can be forwarded to central processing location 120 via communication channel 112, WAN 114 and communication channel 116. The operation of the line interface 107 is controlled by the processor 101 and the information upload OS 110. As mentioned above, the communication channels 112 and 116 can be any commonly known and available communication channels, and can include a dedicated connection, in which case the information is not transferred via WAN 114. After line interface 107 establishes a communication channel to central processing location 120, the contents of local storage element 102 will be forwarded via bus 109 and through line interface 107 to central processing location 120.

Central processing location 120, after receipt of the contents of local storage element 102, can send an acknowledgement signal back to information upload module 100, via communication channels 116, 112 and WAN 114, informing the information upload module 100 of successful transfer. Upon receipt of the acknowledgement message, the information upload module 100 can empty its local storage element 102, thereby making it available for additional information upload.

Central processing location 120, after receipt of the contents of local storage element 102, can process the information in a number of ways. For example, central processing location 120 can print the information into electronically transferable photographic prints and forward those to end user 122 via, for example but not limited to, communication channel 124. Communication channel 124 can be any generally available communication channel similar to communication channels 112 and 116. Alternatively, central processing location 120 can place the digital images on a web site 121, whereby end user 122 accesses the web site 121 via communication channel 126 (also similar to communication channels 112 and 116) and WAN 114, or accesses the web site 121 directly via communication channel 124. In this manner, an end user 122 can log onto the web site 121 of the central processing location 120 and view the images in order to decide which ones to print. Alternatively, central processing location 120 can create conventional photographic prints of the information from local storage element 102 and conventionally mail those to end user 122.

Figure 2A:
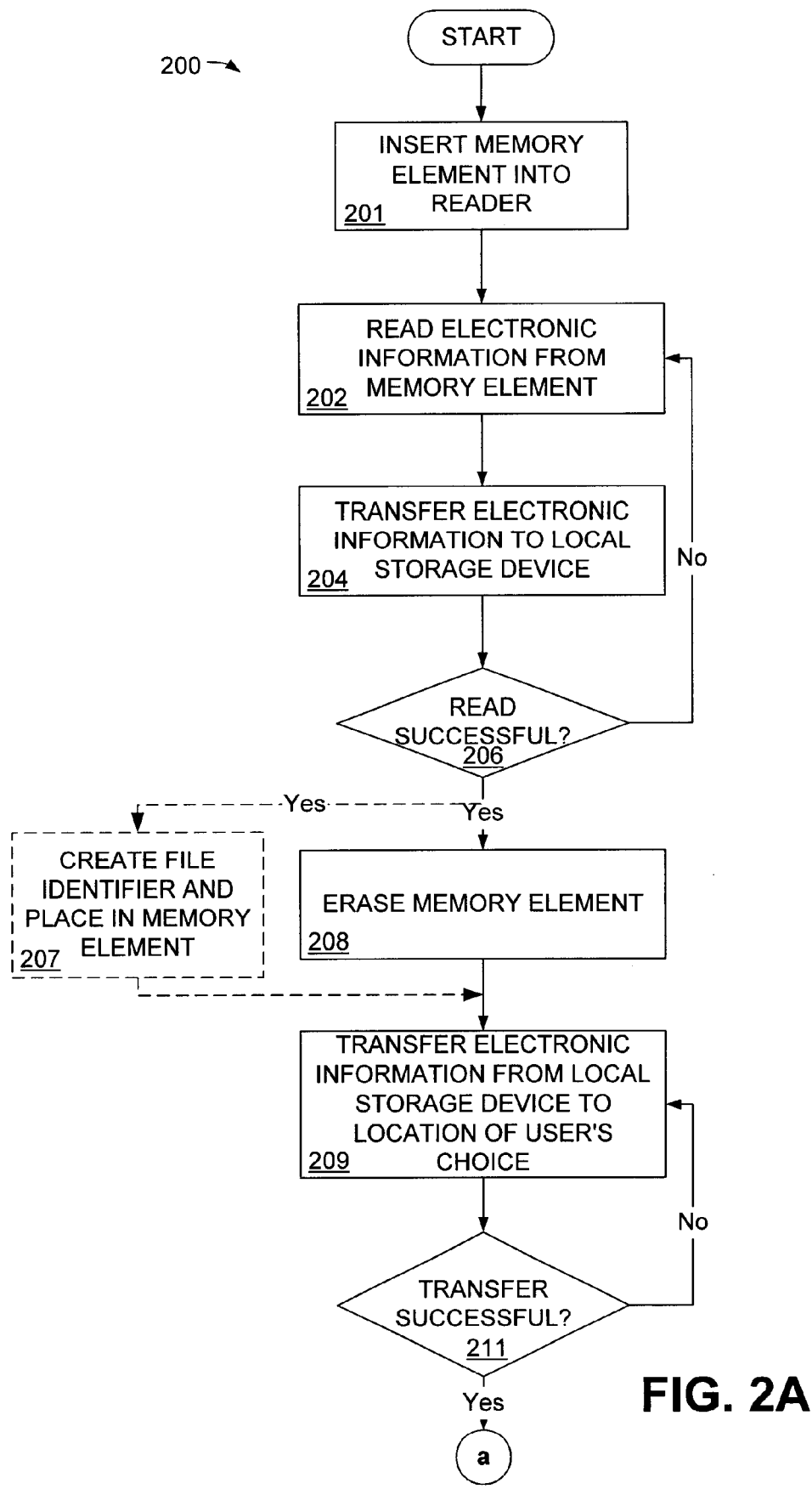
FIGS. 2A and 2B are flowcharts collectively illustrating the operation of an aspect of the digital memory upload method and system of the invention.
Figure 2B:
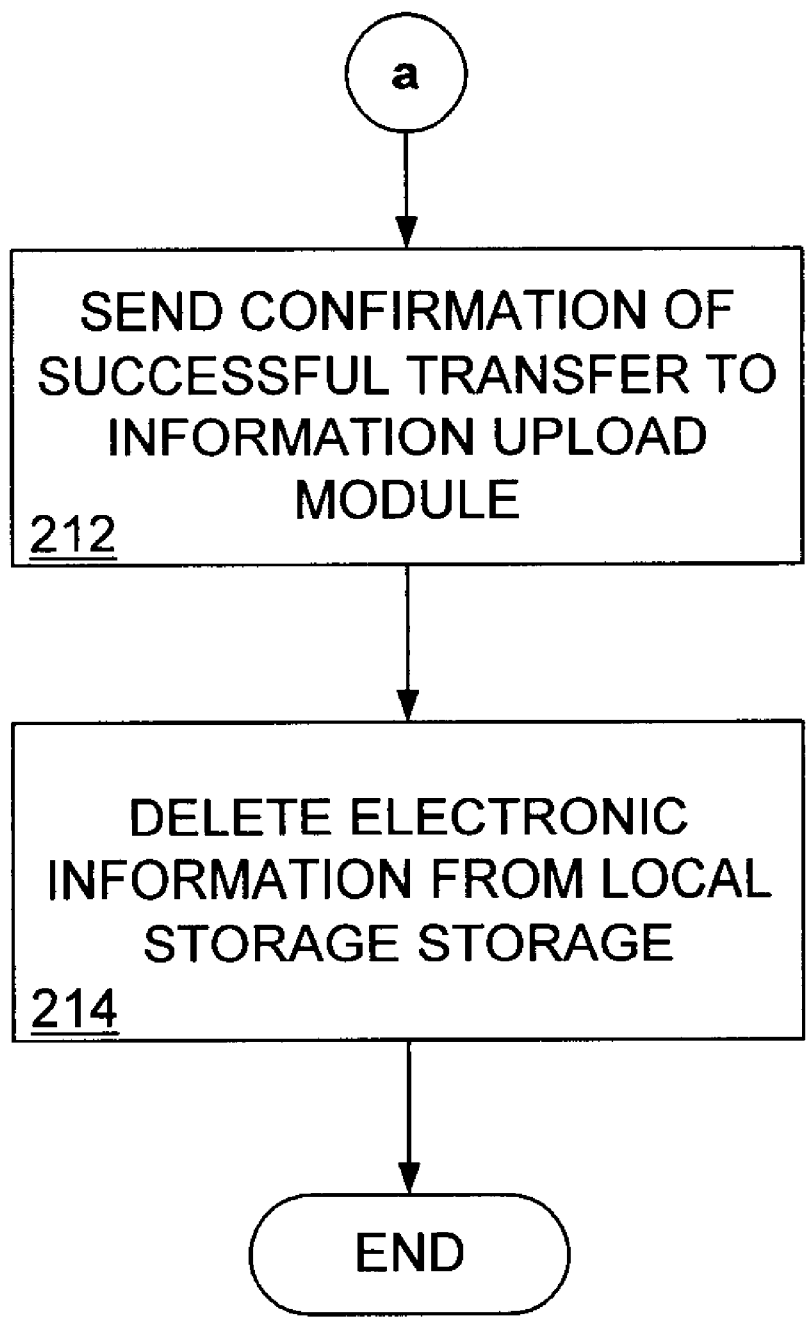

FIGS. 2A and 2B are flowcharts collectively illustrating the operation of an aspect of the digital memory upload method and system of the invention. The flow charts of FIGS. 2A and 2B show the architecture, functionality, and operation of a possible implementation of the digital memory upload method and system of the invention. In this regard, each block represents a module, segment, or portion of code, which comprises one or more executable instructions for implementing the specified logical function(s). It should also be noted that in some alternative implementations, the functions noted in the blocks may occur out of the order noted in FIGS. 2A and 2B. For example, two blocks shown in succession in FIG. 2A may in fact be executed substantially concurrently or the blocks may sometimes be executed in the reverse order, depending upon the functionality involved, as will be further clarified below.

With reference now to FIG. 2A, in block 201 memory element 103 (FIG. 1) is inserted into reader 104 (FIG. 1). As mentioned above, although illustrated as being inserted into reader 104, the information contained in memory element 103 may be communicated to reader 104 via, for example, but not limited to, IR transfer, or any other electronic or optical transfer. In block 202, the reader 104 reads the electronic information from memory element 103. In block 204, the information contained within reader 104 is transferred to local storage element 102 via bus 109 (FIG. 1).

In block 206, compare element 106 (FIG. 1) determines whether the transfer of information from memory element 103 to reader 104 is successful by comparing the contents of each. The verification that the read is successful can be done by comparing the copy on the local storage element 102 to the copy on the memory element 103, or by using some parity or error checking communication method. If it is determined in block 206 that the transfer of information was not successful, then the process returns to block 202 where the reader 104 attempts to read the memory element 103 again. If, in block 206, it is determined that the transfer of information from memory element 103 to local storage element 102 was indeed successful, then, in block 207, the information upload OS 110 optionally creates a file identifier corresponding to the information transfer from memory element 103 to reader 104 and to local storage element 102. This file identifier is placed within memory element 103, as, for example, a data file. In FIG. 2A, the block 207 is shown with a dotted line to illustrate that this step is optional. In block 208 the memory element 103 can be erased by reader 104, thereby freeing the memory element 103 for further use.

In block 209 the electronic information read from memory element 103 and stored in local storage element 102 is transferred to central processing location 120 via communication channels 112, 116 and WAN 114 (FIG. 1). In accordance with an aspect of the invention, when a user wishes to upload the contents of memory element 103, the user will identify to the information upload module 100 an address corresponding to the location that the user wishes the electronic information to be sent. Although described as being sent to central processing location 120, the information uploaded from memory element 103 can be sent to any location of the user's choice, for example but not limited to, the user's own home computer.

In block 211, it is determined whether the transfer of the electronic information from local storage element 102 to the central processing location 120 is successful. If the transfer was not successful, the processor returns to block 209 where another transfer attempt is made. If the transfer is repeatedly unsuccessful, the information upload module 100 can attempt the transfer at a later time, or can communicate the failed attempts to the user and query the user for further instruction, such as canceling the transfer, attempting the transfer at a later time, entering an alternative location to which to transfer the information, etc.

If the transfer is successful, then in block 212, and now referring to FIG. 2B, the central processing location 120 will send a confirmation message (in the form of an acknowledgement) to the information upload module 100, thus confirming the successful receipt of the uploaded information by central processing location 120. In block 214, the electronic information stored in local storage element 102, and corresponding to the contents of memory element 103, is deleted, thereby freeing local storage element 102 for further use.

It will be obvious to those skilled in the art that many modifications and variations may be made to the preferred embodiments of the invention, as set forth above, without departing substantially from the principles of the invention. All such modifications and variations are intended to be included herein within the scope of the invention, as defined in the claims that follow.

What is claimed is:

1. A method for uploading electronic information from a memory element, the method comprising the steps of:
   transferring the electronic information from the memory element to a local storage device;
   comparing a representation of the electronic information as received at the local storage device with the electronic information from the memory element;
   transferring the representation of the electronic information from the local storage device to a first location corresponding to an address entered by a user;
   storing the electronic information at the first location; and
   making the electronic information available to the user from the first location.

2. The method of claim 1, further comprising the step of erasing the memory element after the electronic information is transferred to the local storage device.

3. The method of claim 1, further comprising the step of creating a file in said memory element, said file representative of said electronic information transferred to said local storage device.

4. The method of claim 1, further comprising the step of erasing said local storage device after the electronic information is transferred to the first location.

5. The method of claim 1, wherein the local storage device is located at any of a gasoline pump, a convenience store, a hotel and a kiosk.

6. The method of claim 1, wherein the electronic information is transferred to the first location via a wide area network (WAN).

7. The method of claim 1, wherein the electronic information is transferred to the first location via a dedicated connection.

8. The method of claim 1, wherein the electronic information corresponds to photographic images.

9. The method of claim 8, further comprising the step of transferring said photographic images to said user.

10. The method of claim 1, further comprising the step of placing the electronic information in the form of photographic images on a world wide web (WWW) site maintained at said first location.

11. The method of claim 10, further comprising the step of said user accessing said WWW site to order said photographic images.

12. A system for uploading electronic information from a memory element, comprising:
   an electronic reader configured to read the electronic information from the memory element;
   a local storage device associated with the electronic reader, the local storage device configured to receive and store the electronic information;
   a compare element associated with the electronic reader and the local storage device, the compare element configured to ensure the accurate reproduction of the electronic information from the memory element in the local storage device; and
   a line interface configured to transfer the electronic information from the local storage device to a first location corresponding to an address entered by a user, wherein the electronic information is available to the user from the first location.

13. The system of claim 12, wherein the memory element is erased after the electronic information is transferred to the local storage device.

14. The system of claim 12, wherein the local storage device is erased after the electronic information is transferred to the first location.

15. The system of claim 12, wherein the electronic reader and the local storage device are located at any of a gasoline pump, a convenience store, a hotel and a kiosk.

16. The system of claim 12, further comprising a wide area network (WAN) over which the electronic information is transferred to the first location.

17. The system of claim 12, further comprising a dedicated connection over which the electronic information is transferred to the first location.

18. The system of claim 12, wherein the electronic information corresponds to digital photographs.

19. The system of claim 18, wherein said photographic images are transferred to said user.

20. The system of claim 12, further comprising a world wide web (WWW) site, maintained at said first location, upon which the electronic information in the form of photographic images is placed.

21. The system of claim 20, wherein the user accesses the web site to order the photographic images.

22. A computer readable medium having a program for uploading electronic information from a memory element, the program comprising logic configured to perform the steps of:
   transferring the electronic information from the memory element to a local storage device;
   comparing a representation of the electronic information as received at the local storage device with the electronic information from the memory element;
   transferring the representation of the electronic information from the local storage device to a first location corresponding to an address entered by a user;
   storing the electronic information at the first location; and
   making the electronic information available to the user from the first location.

23. The computer readable medium of claim 22, further comprising logic configured to perform the step of erasing the memory element after the electronic information is transferred to the local storage device.

24. The computer readable medium of claim 22, further comprising logic configured to perform the step of erasing said local storage device after the electronic information is transferred to the first location.

25. The computer readable medium of claim 22, wherein the local storage device is located at any of a gasoline pump, a convenience store, a hotel and a kiosk.

26. The computer readable medium of claim 22, further comprising logic configured to transfer the electronic information to the first location via a wide area network (WAN).

27. The computer readable medium of claim 22, further comprising logic configured to transfer the electronic information to the first location via a dedicated connection.

28. The computer readable medium of claim 22, wherein the electronic information corresponds to digital photographs.

29. The computer readable medium of claim 28, further comprising logic configured to perform the step of transferring said photographic images to said user.

30. The computer readable medium of claim 22, further comprising logic configured to perform the step of placing the electronic information in the form of photographic images on a world wide web (WWW) site maintained at said first location.

31. The computer readable medium of claim 30, further comprising logic configured to perform the step of said user accessing said WWW site to order said photographic images.

32. A system, for uploading electronic information from a digital camera memory element, comprising:

an electronic reader enclosed within the housing of a fuel pump assembly the electronic reader configured to read the electronic information from the digital camera memory element;

a local storage device associated with the electronic reader, the local storage device configured to receive and store the electronic information;

a compare element associated with the electronic reader and the local storage device, the compare element configured to ensure the accurate reproduction of the electronic information from the memory element in the local storage device; and a line interface configured to transfer the electronic information from the local storage device to a processing facility, the processing facility having the ability to process the electronic information into a printed image.

* * * * *